UNITED STATES PATENT OFFICE.

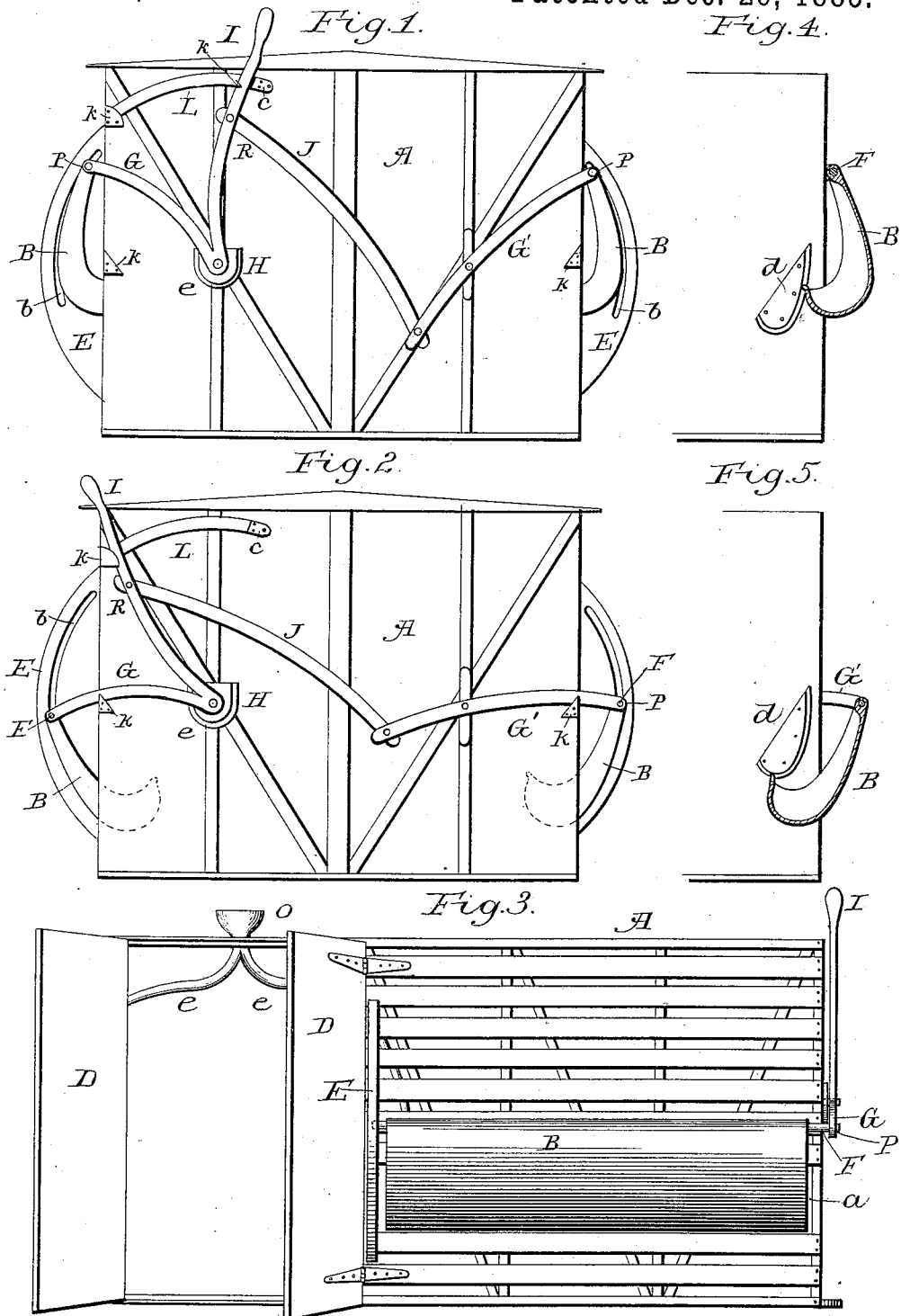

GENEVA ARMSTRONG, OF ELMIRA, NEW YORK.

STOCK-CAR.

SPECIFICATION forming part of Letters Patent No. 333,378, dated December 29, 1885.

Application filed October 16, 1885. Serial No. 180,059. (No model.)

*To all whom it may concern:*

Be it known that I, GENEVA ARMSTRONG, a citizen of the United States, residing at Elmira, Chemung county, New York, have invented a new and useful Adjustable Trough for Feeding and Watering Live Stock on Railroad-Cars, of which the following is a specification.

My invention relates to a new and useful adjustable trough for feeding and watering live stock on railroad-cars, in which by a system of compound levers the watering-trough may be adjusted for use, emptied, and removed when not in use by a handle conveniently located, and having a funnel communicating by pipes with said troughs, so that water may be supplied thereto from the apparatus used for supplying water to locomotives.

The object of my invention and improvements is to afford facilities for watering and feeding live stock on railroad-cars. I attain this object by means of the mechanism illustrated in the accompanying drawings, in which—

Figure 1 represents an end view of a car with the adjusting machinery attached in the position thereof when not in use, the troughs being partially inverted in secure position on the outside of the car. Fig. 2 is a similar view with the adjusting machinery shown in the position when in use. Fig. 3 is a side view of a part of a car with the doors open and the trough in position when in use. Figs. 4 and 5 are detached views showing the inside guide and the position of the trough when out of use and in use, respectively.

In these several figures, A represents the body of a stock-car constructed in its principal features in the ordinary manner, the side boards being so placed as to leave spaces between them for ventilation, and a larger space, $a$, at a suitable height from the bottom to accommodate the cattle while feeding, through which may be inserted a portion of the swinging troughs B. These troughs are preferably four in number—two upon each side of the car—so as to allow space between them for the swinging doors D, this style of door being substituted for the sliding door in order to allow the guide-brackets E of the swinging troughs to be firmly secured to the posts at each side of the doors, which they could not be with the ordinary door sliding upon the outside, although they might be secured to said posts were the doors constructed to slide inside the car; but I prefer the construction shown, as when the doors D are thrown open they form guards, which protect the guide-brackets and assist in directing the cattle into the car when loading.

The troughs B are constructed of any suitable material—such as sheet metal, papier-maché, or wood—it being necessary that they should not only be strong enough to stand the hard usage to which feed and water troughs upon stock-cars are unavoidably subjected, but also so light as to be easily handled. That portion of the trough next to the car has preferably a semicircular, or approaching thereto, cross-section, while the opposite or outer side extends upward in a slight curve, and is secured to a rod or shaft, F, one end of which travels in a groove, $b$, formed in the brackets E, the opposite end being pivotally connected with one of the levers G or G', located at the ends of the car. The levers G are pivoted upon the metal plates H, firmly secured to the ends of the car, each of said levers G being provided with an upwardly-extending arm, I, which forms a hand-lever extending above the car, which, when moved in one direction, will cause the trough hung to the lever G to swing through the space $a$ in the side of the car far enough to allow the cattle to drink or eat therefrom, while a movement in the opposite direction will withdraw the trough and cause it to hang in nearly a vertical position at the side of the car, when any water or food that is left therein will be emptied out, thus providing a means of keeping the troughs clear of ice in cold weather.

In order to operate the troughs on both sides of the car simultaneously, the lever G', which is also pivoted upon the end of the car, is connected with the lever G by means of the bar J, which has a pivotal connection with both levers and causes them to move together.

Stops K are secured to the corners of the car, and serve as supports for the troughs when in their lowered position, and the segmental guide L, along which the hand-lever I travels, being supplied with a suitable catch, $c$, at its inner end, retains them in a raised position.

In order to insure the movement of the troughs in the desired direction when raised or lowered, grooved guide-plates *d* are secured to the inner side of each end of the car, a suitable projection upon the extreme end of the front edge of each trough entering the groove in said guide-plates and causing the same to follow the direction of said groove. It will therefore be apparent that by moving the lever I the troughs are swung into position to receive water or food. If the latter, either grain or hay may be introduced over the top of the trough, the space between it and the side of the car forming an excellent hay-rack, and when it is desired to supply the troughs with water the car may be brought under the spout of the water-tanks in common use for supplying the locomotives, and any desired quantity passed into the troughs through the funnel O and branch pipes *e*, which extend from the funnel to each of the troughs. These troughs and their operating devices are so constructed and so compactly arranged that at no time can any part of the apparatus extend more than ten or twelve inches from the side of the car, thus avoiding all danger of collision with other cars when in motion.

Having thus described my invention, I claim as new and desire to secure by Letters Patent the following:

1. In a stock-car, the swinging troughs suspended outside the car by suitable levers connected together and operated at each end of said car, in combination with the funnel and branch pipes for supplying said troughs with water, as set forth.

2. In a stock-car, the movable troughs and their operating-levers, in combination with the grooved guide-brackets extending outwardly from each side of the car-door for the purpose of guiding one end of the troughs, as specified.

3. In a stock-car, the movable troughs and their operating-levers, in combination with the brackets E and guide-plates *d*, arranged to guide both ends of the troughs, in the manner set forth.

4. In a stock-car provided with outwardly-swinging side doors and side openings, *a*, the combination of the suspended and movable troughs, the levers for operating them, and the guide-brackets and guide-plates adapted to cause the troughs to pass through the space *a* to the interior of the car when lowered and be drawn therefrom when raised, substantially as set forth.

GENEVA ARMSTRONG.

Witnesses:
HOSEA H. ROCKWELL,
CHARLES A. COLLIN.